Oct. 2, 1962  J. L. FULLER ET AL  3,056,506
ROTARY RECORD EQUIPMENT
Filed June 23, 1961  6 Sheets-Sheet 1

INVENTORS
JAMES L. FULLER
SAMUEL ASTON LOYD
BY
Gary, Desmond & Parker
ATTYS.

INVENTORS
JAMES L. FULLER
SAMUEL ASTON LOYD
BY Gary, Desmond & Parker
ATTYS.

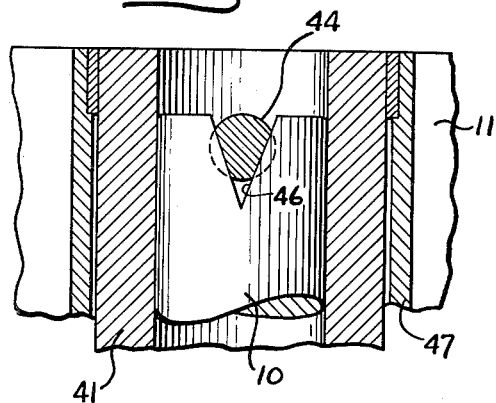
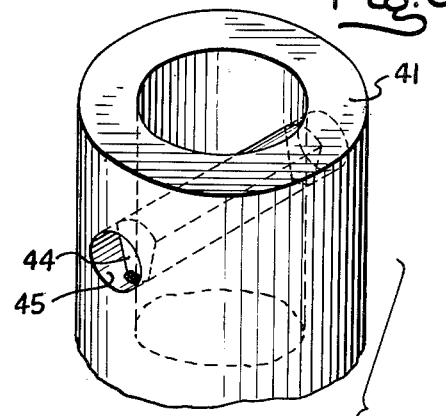
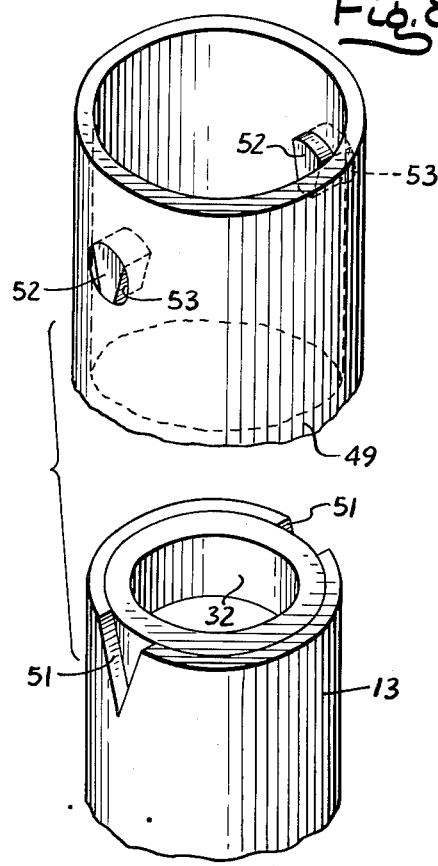
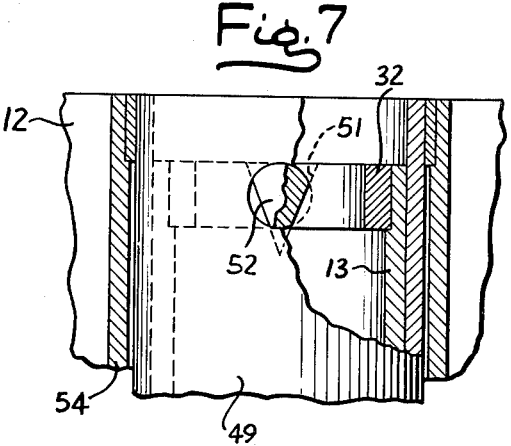

Oct. 2, 1962

J. L. FULLER ET AL 3,056,506

ROTARY RECORD EQUIPMENT

Filed June 23, 1961

INVENTORS
JAMES L. FULLER
SAMUEL ASTON LOYD
BY
Gary, Desmond & Parker
ATTYS.

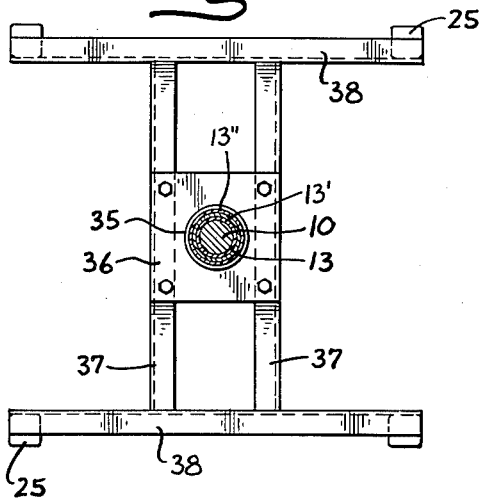
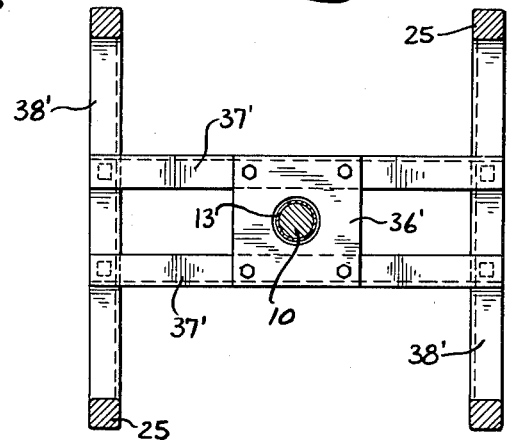
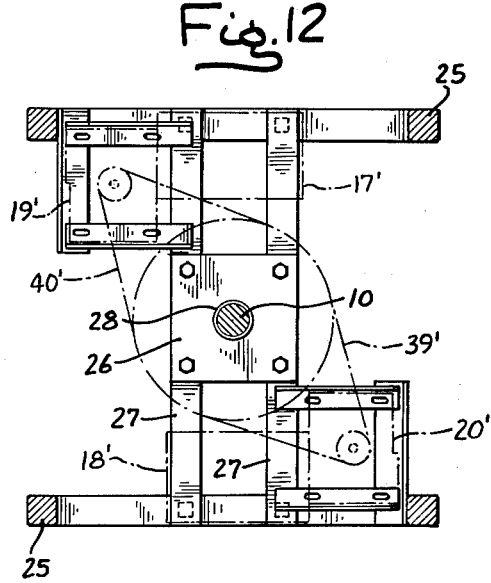
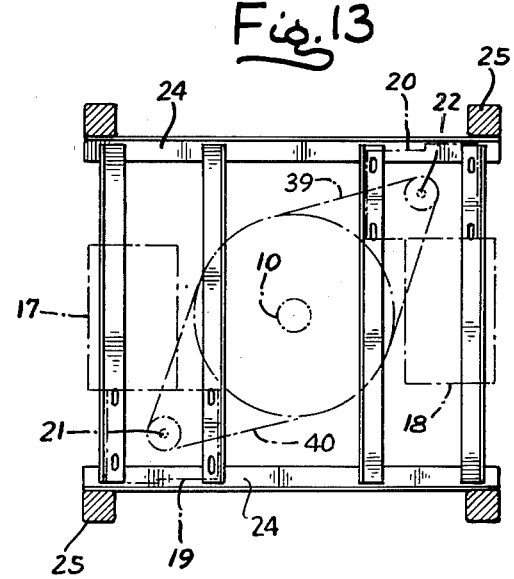
INVENTORS
JAMES L. FULLER
SAMUEL ASTON LOYD United States Patent Office 3,056,506
Patented Oct. 2, 1962

3,056,506
ROTARY RECORD EQUIPMENT
James L. Fuller and Samuel Aston Loyd, both of Waynesboro, Va., assignors to Acme Visible Records, Inc., Crozet, Va., a corporation of Delaware
Filed June 23, 1961, Ser. No. 119,222
6 Claims. (Cl. 211—1.6)

This invention relates to record filing or holding equipment and to means for gaining ready access to the contents thereof.

More particularly, the present invention relates to record filing devices in the form of tiers or platforms arranged, for example, with a plurality of angularly spaced compartments formed by radially disposed dividers, the whole being compactly supported on a unitary stand having vertical shafts whereby the tiers may be rotated by operators seated at one or more fixed positions adjacent to the unit and whereby the operators at the fixed positions may cause the file to be rotated to the desired position for access to the contents thereof.

It is an object of the present invention to provide an improved multi-tiered, rotary, record-carrying device of a compact and novel construction of enhanced accessibility and utility.

A further object of the present invention is to provide a motor-operated, multi-tiered, rotary, record-carrying device which may be controlled by a plurality of operators seated at fixed, angularly spaced positions about the assembly, and which may be selectively controlled by the operators in a manner whereby the tiers may be individually rotated in a clockwise or counterclockwise direction or held against rotation, as desired.

A further object of the present invention relates to novel clutch means which permits a measured slippage to reduce throw in the unit upon starting or stopping rotation of the individual tiers.

Other objects of the present invention relate to details of construction, arrangement of parts, and economies thereof, which will be apparent from the following specification and accompanying drawings, wherein:

FIG. 5 is a fragmentary vertical sectional view of the upper end and tier portion of the arrangement shown in FIG. 2 at an angle of 90° thereto.

FIG. 6 is an exploded fragmentary perspective view of the upper portion of the center drive shaft and its normally embracing upper clutch hub.

FIG. 7 is a fragmentary vertical sectional view illustrating the association of the lower tier of FIG. 2 with the tubular driving shaft therefor; and FIG. 8 is an exploded perspective view showing the means for associating the lower tier in driving relationship with the tubular driving shaft therefor.

FIG. 9 is a fragmentary vertical sectional view of a modified form of the present invention similar to that shown in FIG. 2 but with a greater number of rotatable tiers.

FIG. 10 is a section on the line 10—10 of FIG. 9.
FIG. 11 is a section on the line 11—11 of FIG. 9.
FIG. 12 is a section on the line 12—12 of FIG. 9.
FIG. 13 is a section on the line 13—13 of FIG. 9.

Figure 1:
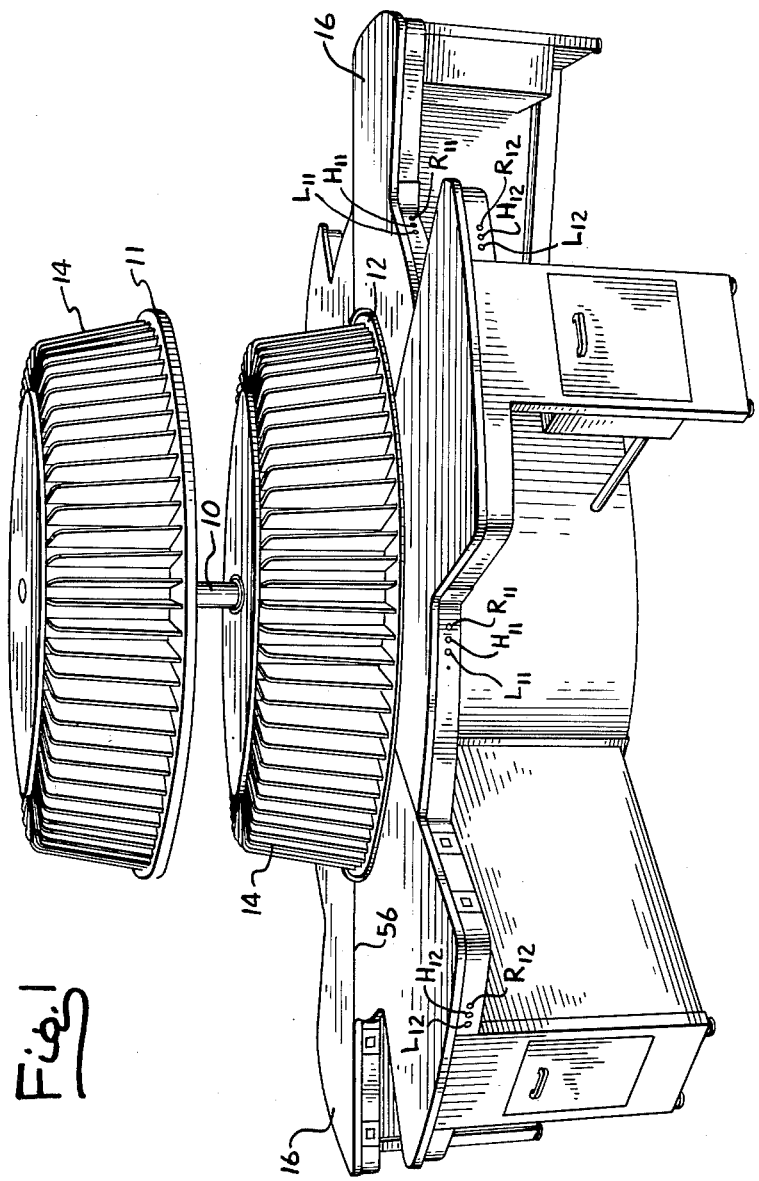
FIG. 1 is a perspective front elevational view of the assembly of the present invention.

Referring to the drawings, and particularly to FIG. 1, the reference numeral 10 indicates a center drive shaft about which there is rotatably mounted an upper tier 11 and a lower tier 12, the upper tier being spaced in this view from the lower tier for clearance in illustration and for depicting the manner in which the tiers may be lifted upwardly and thereby conveniently disassociated from their respective drive shafts, the center drive shaft 10 being associated with the upper tier 11, and a separate tubular drive shaft 13 embracing the center drive shaft 10 being associated with the lower tier 12 for driving relationship therewith.

The respective tiers 11 and 12, in the illustration shown, are provided with a series of angularly spaced, radially extending, upstanding dividers 14 for reception therebetween of records to be filed, which may be in the form of books holding various record means. It will be understood that in lieu of the dividers 14, the tiers 11 and 12 may be formed with troughs for holding record cards, or provided in any other manner with means for holding a plurality of separate or grouped indicia.

As will appear hereinafter, the drive shafts which rotatably support the tiers are mounted on a supporting frame or stand generally indicated as 15, provided with motor operated driving mechanism, the stand and driving mechanism being enclosed by a desk assembly comprising a plurality of desk sections 16 angularly spaced about but below the record-carrying tiers 11 and 12, leaving angularly spaced openings between them wherein the operators may be seated. These stations are each provided with two groups or sets of normally open switch buttons connected to the operating motors 17 and 18 through suitable relays and reversing switches, not shown.

Thus, each operating station is provided with a normally open switch button L–12 for driving the lower tier 12 to the left, and another button R–12 for driving the lower tier to the right, and a button H–12 for holding it in fixed position and against actuation by operators seated at the other stations, the switch mechanism for tier 12 being connected through the indicated relays, and the reversing mechanism, not shown, to the motor 17. In a similar manner, at the same station there is provided a series of switch buttons L–11, H–11 and R–11 for rotating the upper tier 11 and holding it against rotation through similar relays and reversing switches leading to motor 18.

The motors 17 and 18 include reducing mechanisms 19 and 20, respectively, leading to the output shafts 21 and 22, respectively, and their associated sprockets, and are of the type known as Ratiomotors sold by Boston Gear Works whose output shafts can rotate in either direction by connection of the motor lead wires in a suitable manner to a reversing switch, not shown but well understood. These Ratiomotors are suitably bolted as at 23 to a base member 24 extending between the standards 25 of the frame or stand 15.

A bearing plate 26 is secured centrally of the frame or stand 15 to the cross-members 27, 27 and is formed with an axial opening lined with the bushing 28 which journals the lower end of the vertically extending center drive shaft 10. A sprocket wheel 29 is fixedly secured to the shaft 10 through hub 30, and thrust bearing 31 is disposed between sprocket wheel 29 and thrust plate 26.

The tubular drive shaft 13 freely embraces the center drive shaft 10 and is provided with bushings 32, 32 at its upper and lower ends in contact with the shaft 10. This tubular drive shaft 13 has fixedly secured thereto a sprocket wheel 33, and thrust bearing 34 is disposed between the upper sprocket wheel 33 and the lower sprocket wheel 29.

The tubular drive shaft 13 is further supported in upright position by being journaled in the bushing 35 seated in the plate 36 secured to the cross-members 37, 37 extending between upper frame member components 38.

Figure 4:
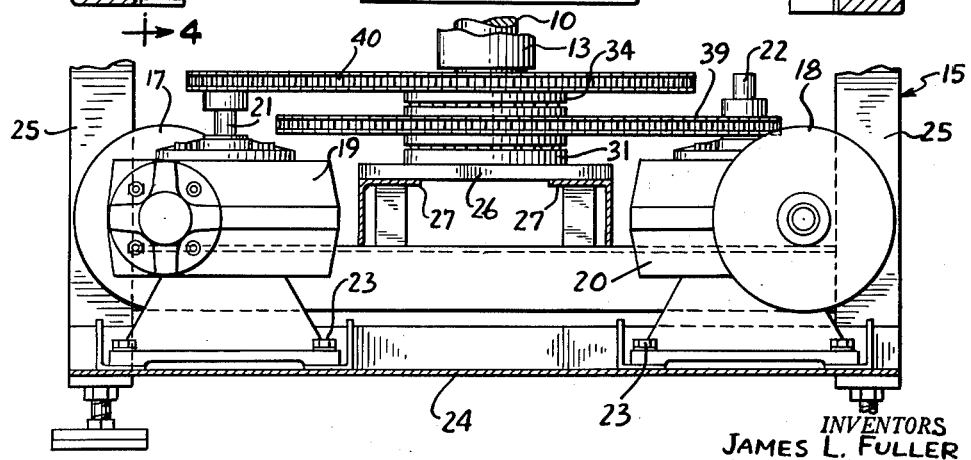
FIG. 4 is a section on the line 4—4 of FIG. 3.

As shown in FIG. 4, a sprocket chain 39 is associated with sprocket 29 leading to the output shaft sprocket of the shaft 22 of Ratiomotor 18 for rotating the main shaft 10. Similarly, a sprocket chain 40 is associated with the sprocket on output shaft 21 of Ratiomotor 17 and sprocket wheel 33 for rotating the tubular drive shaft 13.

For supporting and driving the upper tier 11 there is associated with the upper end of center or main drive shaft 10 an upper clutch hub 41 which has fixedly secured to its lower peripheral portion the clutch plate 42. This clutch plate 42 carries on its upper surface a friction lining composition 43 which is suitably composed of automobile clutch facing composition material composed, for example, of fibrous asbestos, friction material fillers and hardened organic binder as is well known in the automotive friction material art.

Thus, upper clutch hub 41 and its associated clutch plate 42 is rotatably associated with the drive shaft 10 by means of a wedge-shaped hanger pin 44 seated in and welded to diametrically opposed apertured areas 45, 45 in the wall of the hub 41. This pin 44 seats and wedges in the V-shaped slot 46 extending diametrically across the upper end of center drive shaft 10, as best shown in FIGS. 5 and 6.

The upper tier 11 comprises a tier hub 47 freely embracing the clutch hub 41, and an integral bearing plate 48 which seats on the clutch plate 42, or rather the friction liner 43 thereof.

It will be noted that for assembling and disassembling the respective components the tier 11 and its associated hub and bearing plate may be vertically lifted and removed from the clutch plate 42. In a similar manner, the clutch plate and its associated hub 41 and its further associated pin 44 may be lifted from the center drive shaft 10 and thus simply disassociated therefrom.

In operation of the assembly, as previously indicated, depression of the open switch button L–11 will energize the motor 18 and cause the tier 11 to revolve to the left to a degree desired by the operator; that is to say, to a point where the desired segment of tier 11 is presented to the operator station, at which time he releases pressure on the button L–11 opening the switch, thus stopping the motor, and consequent rotation of the shaft 10.

The clutch facing 43 serves a dual purpose in this operation and permits a measured limited slippage to reduce throw in the unit when it is started and stopped. Thus, although rotation of the center drive shaft 10 is abrupt, there is some inertia of the tier 11 so that there is a slight initial slippage until it starts to rotate, making a smooth, gradual operation; and, conversely, although release of the switch button abruptly stops rotation of the drive shaft 10, momentum of the tier 11 will carry it forward slightly by slipping on the clutch facing 43 to bring about a smooth stoppage, and the operator can learn to gauge this so that the correct opening on tier 11 will be brought to his station. The same holds true, of course, in operating in the reverse direction by means of the button R–11 as previously indicated.

The tubular drive shaft 13 terminates at its upper end below upper clutch hub 41. A second or lower clutch hub 49 embraces shaft 13 and has an integrally associated annular clutch plate 50 carrying a clutch facing composition 57 on its upper surface, similar to that described with respect to clutch facing 43.

The tubular drive shaft 13 is formed at its upper end with a pair of diametrically opposed, upwardly opening V-slots 51, 51 which receive the wedge-shaped pins 52, 52 welded within apertured areas 53, 53 formed in the upper end of the clutch hub 49. It will be noted that these hanger pins 52, 52 project inwardly of the hub 49 a distance sufficient to securely anchor by gravity in the companion slots 51, 51, and in this manner when the tubular drive shaft 13 is caused to rotate by actuation of the motor 17, the hub 49 will be caused to rotate therewith together with the tier 11 seated on the clutch plate 50.

Similar to the construction described with respect to tier 11, tier 12 also comprises a hub 54 which freely embraces clutch hub 49, and an integral annular bearing plate 55 which seats on clutch facing 57 for driving engagement in the manner described previously with respect to tier 11. Here, also, the tier 12 may be removed by lifting it upwardly, after of course first removing tier 11.

The form of construction shown in FIGS. 9 to 13 is illustrative of a device similar to that previously described but which specifically has more than two rotatable tiers. Thus as shown in FIG. 9, this modified form, in addition to tiers 11 and 12 as in the form previously described, comprises rotatable tiers 12′ and 12″ successively disposed below tier 12 and operatively associated with tubular drive shafts 13′ and 13″ respectively, which tubes are concentrically disposed about tube 13 and shaft 10.

Figure 2:
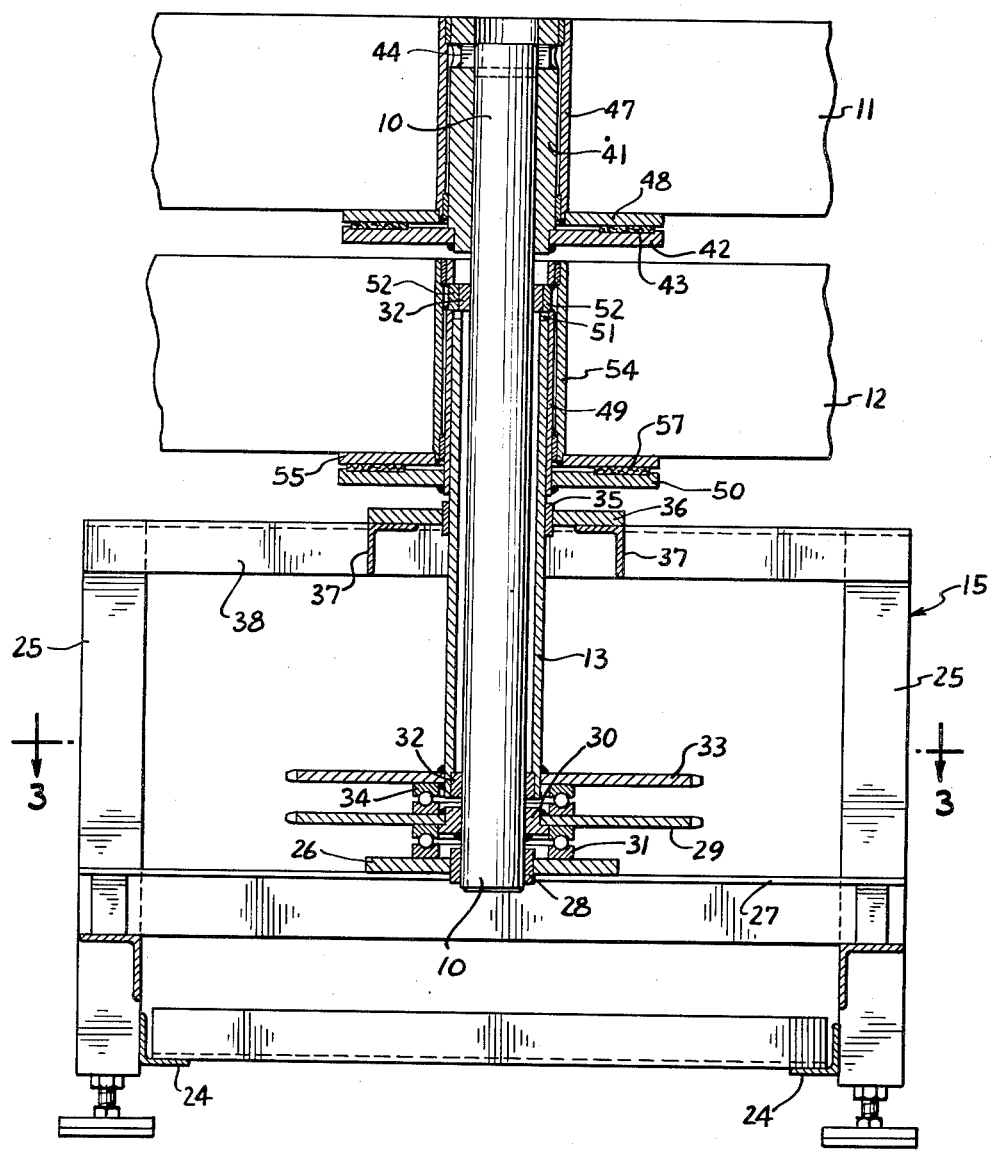
FIG. 2 is a fragmentary vertical sectional view of the device of the present invention with parts removed and particularly illustrating the means whereby the respective tiers are rotatably mounted on a supporting stand.
Figure 3:
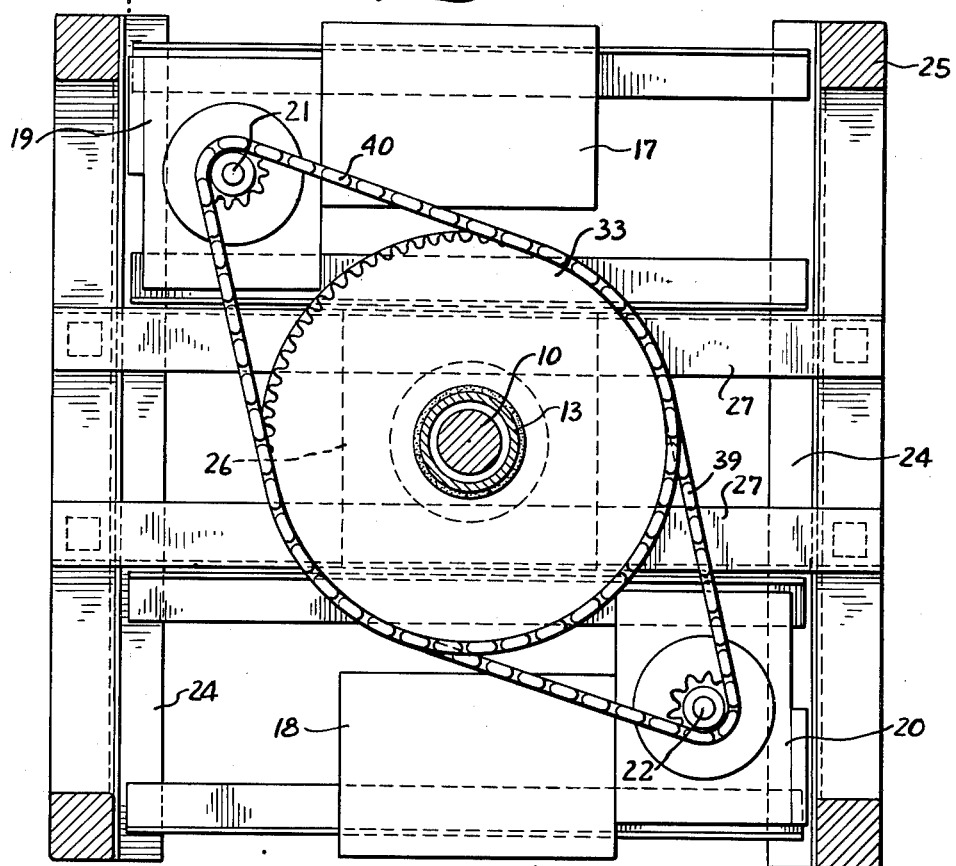
FIG. 3 is a transverse sectional view taken on the line 3—3 of FIG. 2 with added details.

In FIG. 9 it will be understood that with the exception of the shaft 10 and the tube 13 being relatively longer than the shaft and tube shown in FIG. 2, the method of supporting and rotating tiers 11 and 12 in FIG. 9 is the same as that shown and described in FIG. 2.

Tiers 12′ and 12″ are supported on their tubular drive shafts 13′ and 13″ respectively in the same manner as tier 12 is supported on and driven through tubular shaft 13.

The tubular drive shaft 13′ terminates at its upper end below clutch hub 49. A third clutch hub 49′ embraces tubular shaft 13′ and has an integrally associated annular clutch plate 50′ carrying a clutch facing composition 57′ on its upper surface, similar to that described with respect to clutch facing 43.

The tubular drive shaft 13′ is formed at its upper end with a pair of diametrically opposed, upwardly opening V-slots 51′, 51′ which receive the wedge-shaped pins 52′, 52′ welded within apertured areas formed in the upper end of the clutch hub 49′ similar to the apertures 53, 53 in clutch hub 49. Hanger pins 52′, 52′ project inwardly of the hub 49′ a distance sufficient to securely anchor by gravity in the companion slots 51′, 51′, and in this manner when the tubular drive shaft 13′ is caused to rotate by actuation of the motor 17′ and reducing mechanism 19′, the hub 49′ will becaused to rotate therewith together with the tier 12′ seated on the clutch plate 50′.

Similar to the construction described with respect to tier 12, tier 12′ also comprises a hub 54′ which freely embraces clutch hub 49′, and an integral annular bearing plate 55′ which seats on clutch facing 57′ for driving engagement in the manner described previously with respect to tiers 11 and 12. Here, also, the tier 12′ may be removed by lifting it upwardly, after of course first removing tiers 11 and 12.

The tubular drive shaft 13″ terminates at its upper end below clutch hub 49′. A fourth clutch hub 49″ embraces tubular shaft 13″ and has an integrally associated annular clutch plate 50″ carrying a clutch facing composition 57″ on its upper surface, similar to that described with respect to clutch facing 43.

The tubular drive shaft 13″ is formed at its upper end with a pair of diametrically opposed, upwardly opening V-slots 51″, 51″ which receive the wedge-shaped pins 52″, 52″ welded within apertured areas formed in the upper end of the clutch hub 49″ also similar to the apertures 53, 53 in clutch hub 49. Hanger pins 52″, 52″ project inwardly of the hub 49″ a distance sufficent to securely anchor by gravity in the companion slots 51″, 51″, and in this manner when the tubular drive shaft 13″ is caused to rotate by actuation of the motor 18′ and associated reducing mechanism 20′, the hub 49″ will be cause to rotate therewith together with the tier 12" seated on the clutch plate 50".

Similar to the construction described with respect to tier 12, tier 12" also comprises a hub 54" which freely embraces clutch hub 49"', and an integral annular bearing plate 55" which seats on clutch facing 57" for driving engagement in the manner described previously with respect to tiers 11, 12 and 12'. Here, also, the tier 12" may be removed by lifting it upwardly, after of course first removing tiers 11, 12 and 12'.

An annular bearing plate 36' is secured to the crossmembers 37', 37' carried by the frame members 38', 38' secured substantially medially of the stand 15. On the bearing plate 36' is the thrust bearing 31' supporting the sprocket wheel 33' secured to the tubular drive shaft 13', the latter being thus driven through associated sprocket chain 39' driven by means of motor 18'.

Tubular drive shaft 13" is similarly driven by means of associated sprocket wheel 33", secured to its lower end, and seated on the thrust bearing 31", through sprocket chain 40' associated with output shaft 21' of Ratiomotor 19'.

Although not shown, it will be understood that tiers 12' and 12" are selectively actuated, in a manner described with respect to tiers 11 and 12, through like sets of switch buttons disposed on the desk sections 16 and similarly connected to the operating motors 17' and 18' through suitable relays and reversing switches.

Although we have shown and described the preferred embodiments of our invention, it will be understood by those skilled in the art that changes may be made in the details of construction and arrangement of parts without departing from the spirit of our invention as set forth in the appended claims.

We claim:

1. A rotary record-carrying device comprising a supporting stand, a vertically disposed drive shaft journaled for rotation thereon, a clutch hub embracing said shaft, an annular horizontally disposed clutch plate secured to said clutch hub, hanger means secured to said clutch hub and removably engaged to said shaft holding said clutch hub in rotational engagement with said shaft, friction composition lining on the upper face of said clutch plate, and an annular record tier adapted to be driven by said clutch comprising a tier hub freely embracing said clutch hub and an annular bearing plate secured to the former and seated on the lining carried by said clutch plate.

2. A rotary record-carrying device comprising a supporting stand, a vertically disposed drive shaft journaled for rotation thereon, means for driving said shaft, a clutch hub embracing said shaft, an annular horizontally disposed clutch plate secured to said clutch hub, a hanger pin secured to and extending through said clutch hub and removably seated in a slot on the upper edge of said shaft holding said clutch hub in rotational engagement with said shaft, friction composition lining on the upper face of said clutch plate, and an annular horizontally disposed record tier adapted to be driven by said clutch comprising a tier hub freely embracing said clutch hub and an annular bearing plate secured to the former and seated on the lining carried by said clutch plate.

3. A rotary record-carrying device comprising a supporting stand, a vertically disposed tubular drive shaft journaled for rotation thereon, means for driving said shaft, a clutch hub embracing said shaft, an annular horizontally disposed clutch plate secured to said clutch hub, an opposed pair of hanger pins secured to and extending inwardly of said clutch hub and removably seated in an opposed pair of upwardly open notches formed in the upper edge of said drive shaft holding said clutch hub in rotational engagement with said shaft, friction composition lining on the upper face of said clutch plate, and an annular horizontally disposed record tier adapted to be driven by said clutch comprising a tier hub freely embracing said clutch hub and an annular bearing plate secured to the former and seated on the lining carried by said clutch plate.

4. A multi-tier rotary record-carrying device comprising a supporting stand, a vertically disposed central drive shaft journaled for rotation thereon, means for driving said shaft, a clutch hub embracing said shaft, an annular horizontally disposed clutch plate secured to said clutch hub, hanger pin means secured to said clutch hub and removably engaged to said shaft holding said clutch hub in rotational engagement with said shaft, friction composition lining on the upper face of said clutch plate, an annular horizontally disposed upper record tier adapted to be driven by said clutch comprising a tier hub freely embracing said clutch hub and an annular bearing plate secured to the former and seated on the lining carried by said clutch plate, a tubular drive shaft journaled for separate rotation on said stand embracing said central drive shaft and terminating below said upper record tier, means for driving said tubular shaft, a second clutch hub embracing said tubular shaft, an annular horizontally disposed clutch plate secured to said second clutch hub, hanger pin means secured to said second clutch hub and removably engaged to said tubular shaft holding said second clutch hub in rotational engagement with said tubular shaft, friction composition lining on the upper face of said second clutch plate, and an annular horizontally disposed lower record tier adapted to be driven by said second clutch comprising a tier hub freely embracing said second clutch hub and an annular bearing plate secured to the former and seated on the lining carried by said second clutch plate.

5. A multi-tier rotary record-carrying device comprising a supporting stand, a vertically disposed central drive shaft journaled for rotation thereon, means for driving said shaft, a clutch hub embracing said shaft, an annular horizontally disposed clutch plate secured to said clutch hub, hanger pin means secured to said clutch hub and removably engaged to said shaft holding said clutch hub in rotational engagement with said shaft, friction composition lining on the upper face of said clutch plate, an annular horizontally disposed upper record tier adapted to be driven by said clutch comprising a tier hub freely embracing said clutch hub and an annular bearing plate secured to the former and seated on the lining carried by said clutch plate, a plurality of concentric tubular drive shafts journaled for separate rotation on said stand embracing sad central drive shaft and terminating below said upper record tier in upper endwise spaced relationship to each other, means for driving said tubular shafts, a clutch hub embracing each tubular shaft, an annular horizontally disposed clutch plate secured to each latter clutch hub, hanger pin means secured to each latter clutch hub and removably engaged to a tubular shaft holding one of said latter clutch hubs in rotational engagement with a tubular shaft, friction composition lining on the upper face of said each latter clutch plates, and an annular horizontally disposed lower record tier adapted to be driven by each of said latter clutch plates comprising a tier hub freely embracing a latter clutch hub and an annular bearing plate secured to the former and seated on the lining carried by a latter clutch plate.

6. A multi-tier rotary record-carrying device comprising a supporting stand, a vertically disposed central drive shaft journaled for rotation thereon an annular horizontally disposed clutch plate embracing said shaft and removably engaged to said shaft for rotational engagement therewith, friction composition lining on the upper face of said clutch plate, an annular horizontally disposed upper record tier adapted to be driven by said clutch comprising an annular bearing seated on the lining carried by said clutch plate, at least one tubular drive shaft journaled for separate rotation on said stand embracing said central drive shaft and terminating below said upper record tier, an annular horizontally disposed clutch plate embracing said tubular shaft and removably engaged thereto for rotational engagement therewith, friction composition lining on the upper face of the latter clutch plate, an annular horizontally disposed record tier adapted to be driven by the latter clutch plate comprising an annular bearing plate seated on the lining carried by the latter clutch plate, electrical means for selectively rotating each of said shafts and their associated tiers, and work desk means formed wtih a plurality of angularly spaced openings disposed over said stand embracing said drive shafts below said upper tier, and switch means on said desk at each of said openings for actuation of said electrical means.

References Cited in the file of this patent

UNITED STATES PATENTS

| | | |
|---|---|---|
| 721,806 | James | Mar. 3, 1903 |
| 2,762,513 | Zaninovich | Sept. 11, 1956 |
| 2,902,175 | Shoffner | Sept. 1, 1959 |